(12) United States Patent
Kholoshenko et al.

(10) Patent No.: US 9,042,083 B2
(45) Date of Patent: May 26, 2015

(54) VACUUM CAPACITOR

(75) Inventors: Roman Stanislavovich Kholoshenko, Rostovskaya Oblast (RU); Gennady Viktorovich Kovalenko, Rostovskaya Oblast (RU)

(73) Assignees: Roman Stanislavovich Kholoshenko, Rostovskaya Oblast (RU); Gennady Viktrovich Kovalenko, Rostovskaya Oblast (RU); Ilya Vladimirovich Korsun, Rostovskaya Oblast (RU); Ljudmila Aleksandrovna Nikolaeva, Karsnooarsky Krai (RU)

( * ) Notice: Subject to any disclaimer, the term of this patent is extended or adjusted under 35 U.S.C. 154(b) by 0 days.

(21) Appl. No.: 13/395,016

(22) PCT Filed: Sep. 9, 2010

(86) PCT No.: PCT/RU2010/000496
§ 371 (c)(1),
(2), (4) Date: Mar. 8, 2012

(87) PCT Pub. No.: WO2011/031189
PCT Pub. Date: Mar. 17, 2011

(65) Prior Publication Data
US 2012/0182665 A1    Jul. 19, 2012

(30) Foreign Application Priority Data
Sep. 10, 2009    (RU) .................................. 2009133830

(51) Int. Cl.
*H01G 4/02*    (2006.01)

(52) U.S. Cl.
CPC ....................................... *H01G 4/02* (2013.01)

(58) Field of Classification Search
None
See application file for complete search history.

(56) References Cited

U.S. PATENT DOCUMENTS

| 4,734,924 A * | 3/1988 | Yahata et al. ................. 378/118 |
| 2004/0012910 A1 | 1/2004 | Arai et al. |
| 2007/0281421 A1 | 12/2007 | Cheung |

FOREIGN PATENT DOCUMENTS

| GB | 1291217 | 10/1972 |
| RU | 2141142 | 11/1999 |
| RU | 2008108930 | 9/2009 |

OTHER PUBLICATIONS

English Abstract of RU2141142.
English Abstract of RU2141142, Dated Nov. 10, 1999.

\* cited by examiner

*Primary Examiner* — Jayprakash N Gandhi
*Assistant Examiner* — Dion Ferguson
(74) *Attorney, Agent, or Firm* — Preston Smirman; Smirman IP Law, PLLC

(57) ABSTRACT

The invention relates to the field of electrical engineering, in particular to electrotechnical components, and in this specific case to polar capacitors with a fixed capacitance. The technical result of the use of the invention consists in the possibility of producing electrical energy stores with small dimensions and high capacitance and voltages. The vacuum capacitor comprises an anode arranged outside a vacuum chamber, in which a cathode is arranged as well as a dielectric, between said cathode and anode. Said cathode can be designed in such a way that it can be heated by means of an electrically insulated filament disposed in the vacuum chamber, said vacuum chamber being in the form of a dielectric hermetically sealed cylinder, and said anode is arranged on the outer surface of the dielectric hermetically sealed cylinder. The cathode can be a "cold" cathode with a micropeak-type surface, which enables the loss of free electrons from the surface thereof without any heating, and the anode is located on the outer surface of the dielectric cylinder with a high vacuum and a cathode arranged therein.

6 Claims, 1 Drawing Sheet

VACUUM CAPACITOR

CROSS-REFERENCE TO RELATED APPLICATION

The instant application is a national phase of, and claims priority to, PCT International Application No. PCT/RU2010/000496, filed on Sep. 9, 2010, pending, and Russian Patent Application Serial No. 2009133830, filed Sep. 10, 2009, pending, the entire specifications of both of which are expressly incorporated herein by reference.

FIELD OF APPLICATION

This invention relates to electrical engineering, to fundamental electrical engineering equipment in particular, in this case—to constant capacitance capacitors for polar conditions.

APPLICATION LEVEL

Semiconductor and electrolyte capacitors in use at present are based on the polarization principle. Structurally, they are based on two plates/electrodes, with a dielectric material to be polarized separating them: the positively charged plate is the anode, while the negatively charged plate is the cathode. Electric energy is stored by polarizing the dielectric material. These are the largest of all the capacitors: their electric capacitance is 2 Farads, while their operating voltage is 16 Volts.

Their weak points are their massive size and their heavy weight.

THE ESSENCE OF THE INVENTIVE MODEL

The technological benefit of this invention is that it allows building small-size electric energy accumulation systems of large capacitance and voltage.

This technological effect is achieved by using the following set of important features:

The inventive model represents a vacuum capacitor with an anode located outside the vacuum chamber, which contains a cathode, while a dielectric body is located between them. The design of the cathode allows for its direct heating by an electrically insulated filament. The cathode is located inside the vacuum chamber designed in the form of a hermetically sealed, dielectric cylinder, while the anode is installed on the outer surface of the cylinder. The cathode is designed as a cold cathode with a micropeak surface, which emits free electrons without heat, while the anode is located on the outer surface of the dielectric cylinder with a high vacuum inside, and the cathode is located in that high vacuum.

To confirm theoretical ideas for a vacuum capacitor and to determine the electrical capacitance of the vacuum in it, an experiment was carried out, in which a 6D6A electro-vacuum diode with approximately an inner volume of vacuum of 2.3 $cm^3$ was used as a vacuum capacitor. For this purpose, a 6D6A diode was placed into a metal beaker filled with transformer oil—to have its own anode insulated. The beaker formed the anode of the vacuum capacitor (VC). The cathode could be heated, using a filament transformer with an effective voltage of 6.3 V. The capacitor was charged, using rectified mains voltage (i.e. approximately 310 V) via a current-limiting alternative resistor and an ammeter. Using these devices, a direct 10 mA current was maintained for 8 hours. In 8 hours, voltage between the metal beaker (the anode) and the cathode of the 6D6A diode reached 28 V.

The above measurements were used to calculate the vacuum capacitance of the vacuum capacitor (VC).

It is known that $q_{VC}=I_3 \times t_3 = C_{VC} \times U_3$, where $I_3=0.01$ A, $t_3=8$ hours$=28,800$ s, and $U_3=28$ V. Consequently, $q_{VC}=0.01 \times 28,800=288$ coulombs; consequently, the capacitance is calculated as:

$C_{VC}=q_{VC}/U_3=288/28=10.2857$ Farads, where $I_3$ is the VC charging current, $t_3$ is the VC charging time, $U_3$ is the voltage between the anode and cathode of the VC, $q_{VC}$ is the size of the charge of the VC when its charging is completed, and $C_{VC}$ is the calculated VC capacity.

These calculations show that the new VC has a large capacity. Consequently, it may be used in energy storing systems and other power installations. The electrical capacitance of one cubic centimeter of vacuum, measured with this method, is in excess of 5 Farads per one cubic centimeter, while the operating voltage measures several tens of kilovolts. None of the existing capacitors can achieve this range.

The inventive capacitor contains a cathode which may be heated with an electrically insulated filament, which is installed in a dielectric cylinder under high vacuum, and an anode located on the outer surface of the hermetically sealed dielectric cylinder.

The cathode in the vacuum capacitor is designed as a cold cathode, which emits free electrons from its surface without heat.

The proposed vacuum capacitor is of assistance for finding right technological solutions to the following problems: it may store a large electrical charge at high voltages, which means a large amount of energy, while its own size is small. Consequently, it may be used as an energy accumulator, which requires little time to get charged and then the accumulated energy may be discharged under any operating conditions, suitable for energy storage systems for diverse purposes.

DRAWINGS

This invention is shown in the drawings attached, wherein

In these drawings: 1) cathode, 2) hermetically sealed dielectric cylinder; 3) high vacuum; 4) anode; 5) electrically filament heater of the cathode.

EXAMPLE OF PRACTICAL APPLICATION

Figure 1:
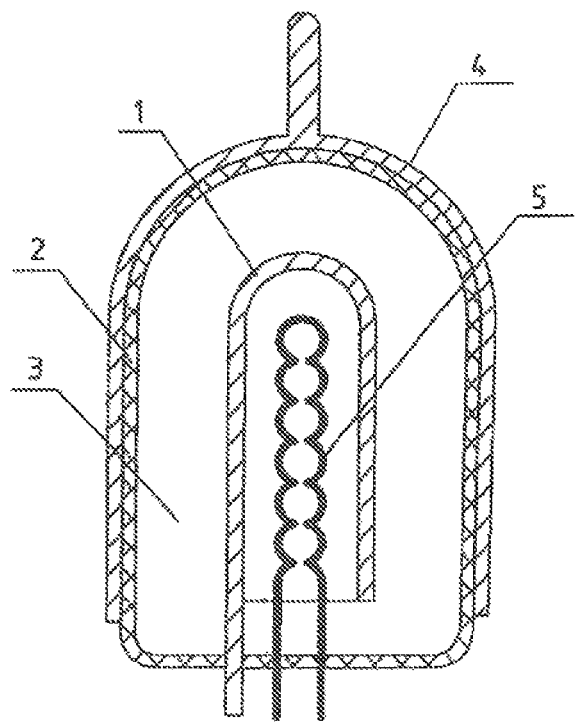
FIG. 1 shows a section of the general assembly of the vacuum capacitor with a hot cathode.

FIG. 1 shows a VC with cathode heated with an electrically insulated filament 5, installed inside a hermetically sealed, dielectric cylinder 2, which is under a high vacuum 3, and anode 4 located on the outer surface of the hermetically sealed, dielectric cylinder 2.

Figure 2:
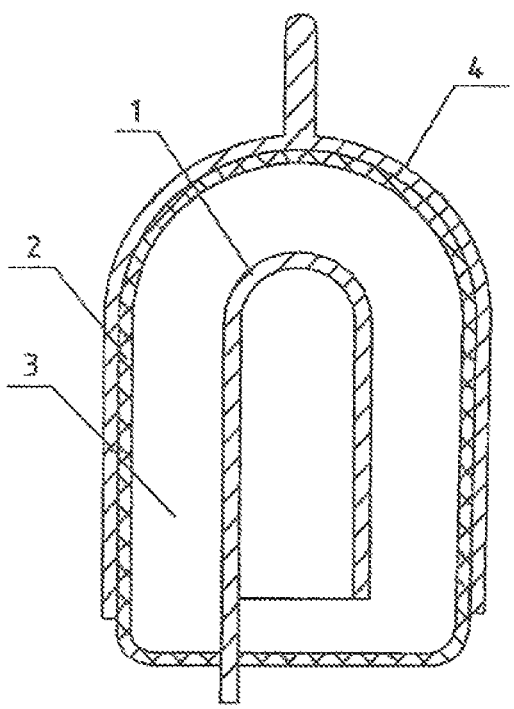
FIG. 2 shows the same assembly with a cold cathode.

FIG. 2 shows a VC with a cold cathode 1 and a micropeak surface, placed in a hermetically sealed, dielectric cylinder 2 with deep vacuum 3, and an anode 4, located on the outer surface of the hermetically sealed, dielectric cylinder 2.

The unique feature of the proposed vacuum capacitor (VC) is that it contains a hot cathode with an electrically insulated filament or a cold cathode with a micropeak surface, which emits electrons for energy accumulation in the vacuum in the hermetically sealed, dielectric cylinder, inside which cylinder the cathode is installed, separated from the anode, installed on the outer surface of the hermetically sealed dielectric cylinder with the deep vacuum.

The unique feature of the energy accumulation process is in that the anode is installed outside the vacuum chamber, while the cathode is located inside it, and they are separated with a dielectric body, and in that energy is accumulated via the accumulation of free electrons in the deep vacuum around the cathode.

INDUSTRIAL APPLICABILITY

The VC charging process: using a special charging device emitting free electrons (similar to the voltage multiplier in vacuum tubes; not shown in the drawings), negative voltage is generated on the cathode relatively to the anode, which causes an emission of free electrons from the cathode into the vacuum; the electrons, which tend towards the anode, cannot reach it because the hermetically sealed dielectric cylinder is on their path; therefore they accumulate in the vacuum, while new free electrons continue to arrive from the cathode, forming a bulk charge around the cathode. This process continues until the voltage of the electric field of the bulk charge becomes level with the voltage of the charging device. When this happens, the charging of the VC is complete.

This invention provides the following technological effects: it allows the building of small-size stationary and self-contained energy storage systems of high capacity, i.e. a new generation of accumulator-type energy supply sources. Using this invention will reduce the size and weight of various types of mobile electronic equipment. It will also assist in designing new equipment, self-contained electric welding equipment for example, which may be used in electrical and radio engineering.

The invention claimed is:

1. A vacuum capacitor, comprising:
a hermetically sealed dielectric body having a cylindrical shape including a hemispherical end portion;
a vacuum chamber formed inside the dielectric body;
an anode disposed on an outer surface of the dielectric body, wherein the anode does not contact the vacuum chamber; and
a cathode installed in the vacuum chamber, wherein a major portion of the cathode does not contact the dielectric body.

2. The vacuum capacitor according to claim 1, wherein the cathode is selectively operable to be heated with an electrically insulated filament located at least partially inside the vacuum chamber, wherein the filament extends through a second end portion of the dielectric body.

3. The vacuum capacitor according to claim 1, wherein the cathode includes a micropeak surface that emits free electrons without any heating of the cathode.

4. The vacuum capacitor according to claim 1, wherein a major portion of the anode includes a configuration substantially corresponding to a major portion of the outer surface of the dielectric body.

5. A vacuum capacitor, comprising:
a hermetically sealed dielectric body having a cylindrical shape including a hemispherical first end portion and a planar second end portion;
a vacuum chamber formed inside the dielectric body;
an anode disposed on an outer surface of the dielectric body, wherein a major portion of the anode includes a configuration substantially corresponding to a major portion of the outer surface of the dielectric body, wherein the anode does not contact the vacuum chamber; and
a cathode installed in the vacuum chamber, wherein a major portion of the cathode does not contact the dielectric body;
wherein the cathode is selectively operable to be heated with an electrically insulated filament located at least partially inside the vacuum chamber, wherein the filament extends through the second end portion of the dielectric body.

6. A vacuum capacitor, comprising:
a hermetically sealed dielectric body having a cylindrical shape including a hemispherical first end portion and a planar second end portion;
a vacuum chamber formed inside the dielectric body;
an anode disposed on an outer surface of the dielectric body, wherein a major portion of the anode includes a configuration substantially corresponding to a major portion of the outer surface of the dielectric body, wherein the anode does not contact the vacuum chamber; and
a cathode installed in the vacuum chamber, wherein a major portion of the cathode does not contact the dielectric body;
wherein the cathode includes a micropeak surface that emits free electrons without any heating of the cathode.

* * * * *